United States Patent [19]

Warren

[11] 3,991,885
[45] Nov. 16, 1976

[54] PATH CONTROL MEANS FOR A SWIVEL OPERATED ARTICLE TRANSFER DEVICE

[76] Inventor: William H. Warren, 729 S. Main St., Centerville, Mass. 02632

[22] Filed: Jan. 27, 1975

[21] Appl. No.: 543,988

[52] U.S. Cl. .............................. 214/1 BV; 214/309
[51] Int. Cl.² ........................................ B65G 47/26
[58] Field of Search ............. 214/1 BV, 1 BD, 8.5 D, 214/147 T, 309; 294/87 A

[56] References Cited
UNITED STATES PATENTS

| | | | |
|---|---|---|---|
| 1,786,608 | 12/1930 | Halstead | 214/147 T |
| 3,272,360 | 9/1966 | Van Der Schoot | 214/309 |
| 3,437,096 | 4/1969 | Warren | 214/1 BV |
| 3,506,140 | 4/1970 | Koch | 214/309 |
| 3,587,888 | 6/1971 | Warren | 214/1 BV |
| 3,610,449 | 10/1971 | Hashimoto | 214/147 T |
| 3,776,393 | 12/1973 | Bargstedt | 214/8.5 D |
| 3,790,001 | 2/1974 | Schnell | 214/1 BD |
| 3,805,943 | 4/1974 | Warren | 214/309 |

*Primary Examiner*—Robert R. Song
*Assistant Examiner*—John A. Carroll
*Attorney, Agent, or Firm*—Holland, Armstrong, Wilkie & Previto

[57] ABSTRACT

An improved device is described for controlling lifter means for carrying articles such as eggs from one position to another and which in particular may be used to carry the articles from one level to another level. The lifter means, such as plates, are attached to the outer ends of pivotal transfer arms by pivotally mounted orbit arms. The positions of the orbit arms on the transfer arms are controlled by a chain and sprocket system with the position of the chain and the relative sprocket sizes being set to cause the plates on the orbit arms to move along a predetermined path differing from the arcuate path of the transfer arm ends and in particular having a path at the beginning and at the end of the transfer which is substantially perpendicular to the surfaces at the pick-up and placing positions regardless of substantial differences of the levels of the positions. A more efficient transfer operation results which is adaptable to a variety of different processing plant arrangements.

12 Claims, 4 Drawing Figures

PATH CONTROL MEANS FOR A SWIVEL OPERATED ARTICLE TRANSFER DEVICE

BACKGROUND OF THE INVENTION

The present invention relates to improvements in article transfer means for performing a transfer operation such as moving eggs from trays to a conveyor or a similar article transfer operation. More particularly, the present invention relates to an improved means for controlling the path of movement of the transfer means during the transfer operation as, for example, by providing generally vertical pick-up movements for the transfer means pick-up and placing positions even where the pick-up and placing positions are at different levels.

The improved transfer means is useful, for example, for high speed automatic transfer machinery for high volume egg handling systems where eggs are transferred from trays to conveyors, etc. The transfer means provides for improved handling of the transferred articles where the pick-up position is at a substantially different level from the placing position. This makes the improved transfer means particularly useful in plants where the machine arrangement necessarily or for more efficiency includes such level differences. In a transfer operation of this type, it is desirable to have the articles lifted initially with a generally vertical motion by the transfer apparatus at the pick-up and placed with a generally vertical movement at a conveyor or other placement point. A convenient and efficient device for such a transfer utilizes pivotally mounted transfer arms carrying lifter plates. The device of the invention modifies the generally arcuate path of such a transfer system to provide the modified path portions at pick-up and placement. The device permits the desired path modifications to be made where the pick-up and the placement levels are substantially different and where they may be altered from time to time to make the most efficient use of the related article handing machines.

A number of prior article transfer devices have provided for some adjustment of the transfer device path such as the one described in my U.S. Pat. No. 3,587,888 dated June 28, 1971 and entitled Transferring Horizontal Batches of Articles to a Different Level. The control means of the present invention is an improvement upon such prior control means. It has a more rugged and simplified structure which is efficient and precise in its path control for the transferred articles and has no elements which might be a source of danger to the operator. The improved control is useful for smooth operation at high operating speeds so that it is particularly adaptable for handling relatively fragile articles such as eggs.

Accordingly, an object of the present invention is to provide an improved article transfer means.

Another object of the present invention is to provide a path control for an article transfer means adapted for smooth and precise operation at relatively high transfer speeds.

Another object of the present invention is to provide a safe and easily sanitized path control device for an egg transfer system.

Another object of the present invention is to provide an improved path control means particularly adapted for use with a pivotally mounted lifter plate article transfer device useful at substantially differing pick-up and placing levels.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein.

DESCRIPTION OF THE PREFERRED EMBODIMENT

The improved control means may be used with transfer systems for handling a variety of articles, however, it has usefulness in egg transfer machines and will be described in connection with an egg transfer machine using vacuum operated egg lifter plates to carry eggs from a pick-up position at one level to a conveyor at another level.

Figure 1:
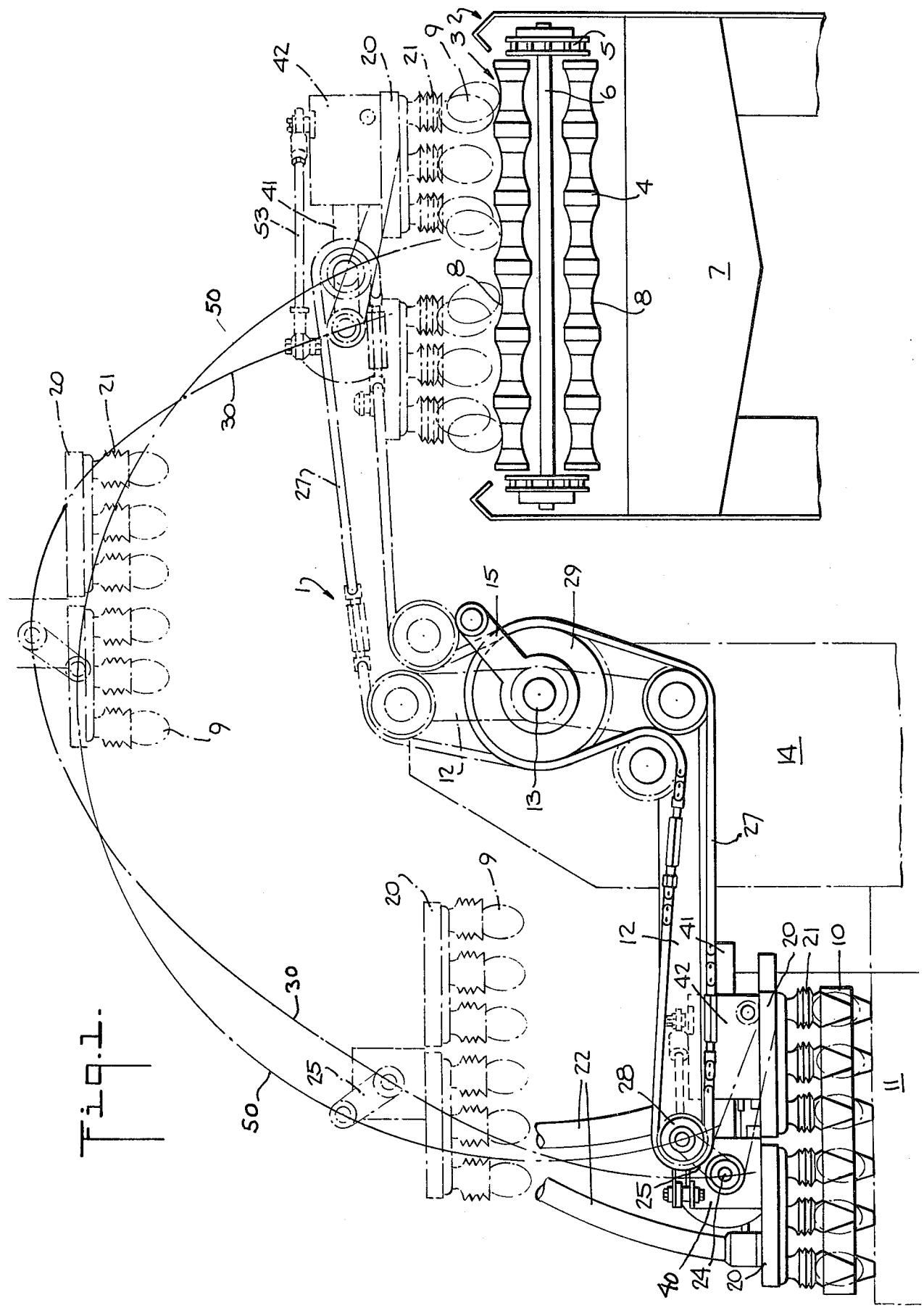
FIG. 1 is a side elevational view illustrating the transfer path control means incorporated in a pivotally mounted egg transfer machine.

FIG. 1 illustrates the improved control means in an egg transfer machine 1 which will not be briefly described as background for a more detailed description of the improved control means. An egg conveyor 2 is shown at the right side of FIG. 1 including a conventional roller conveyor belt 3 having rollers 4 on chains 5 mounted on end pulleys 6 on a support frame 7. The conveyor belt 3 includes rollers 4 having egg receiving pockets 8. The egg conveyor 2 carries eggs 9 to various egg processing devices such as washing, inspecting, breaking, and other egg processing devices.

The egg transfer machine 1 transfers the eggs 9 from the top tray 10 of a stack of trays 10 on a pick-up table 11 to an elevated conveyor 2. The egg transfer machine 1 includes a pair of L-shaped lifter arms 12 pivotally mounted on opposite ends of a drive shaft 13 in the machine frame 14. The drive shaft 13 together with the attached lifter arms 12 are periodically turned to move the lifter arms 12 from their pick-up position, as illustrated at the left side of FIG. 1, to an egg placing position above the conveyor 2 as illustrated in dot-dash lines at the right side of FIG. 1. The lifter arms 12 are moved by the drive shaft 13 which is driven by a suitable drive means, not shown.

A plurality of egg lifter plates 20 are attached to the outer ends of the transfer arms. Each of these lifter plates 20 has a hollow center manifold coupled to a number of resilient vacuum cups 21. The cups 21 are connected through the lifter plate 20 manifolds by suitable coupling hoses 22 to a source of vacuum so that an egg gripping vacuum force is present at each of the vacuum cups 21 during the transfer operation.

Figure 2:
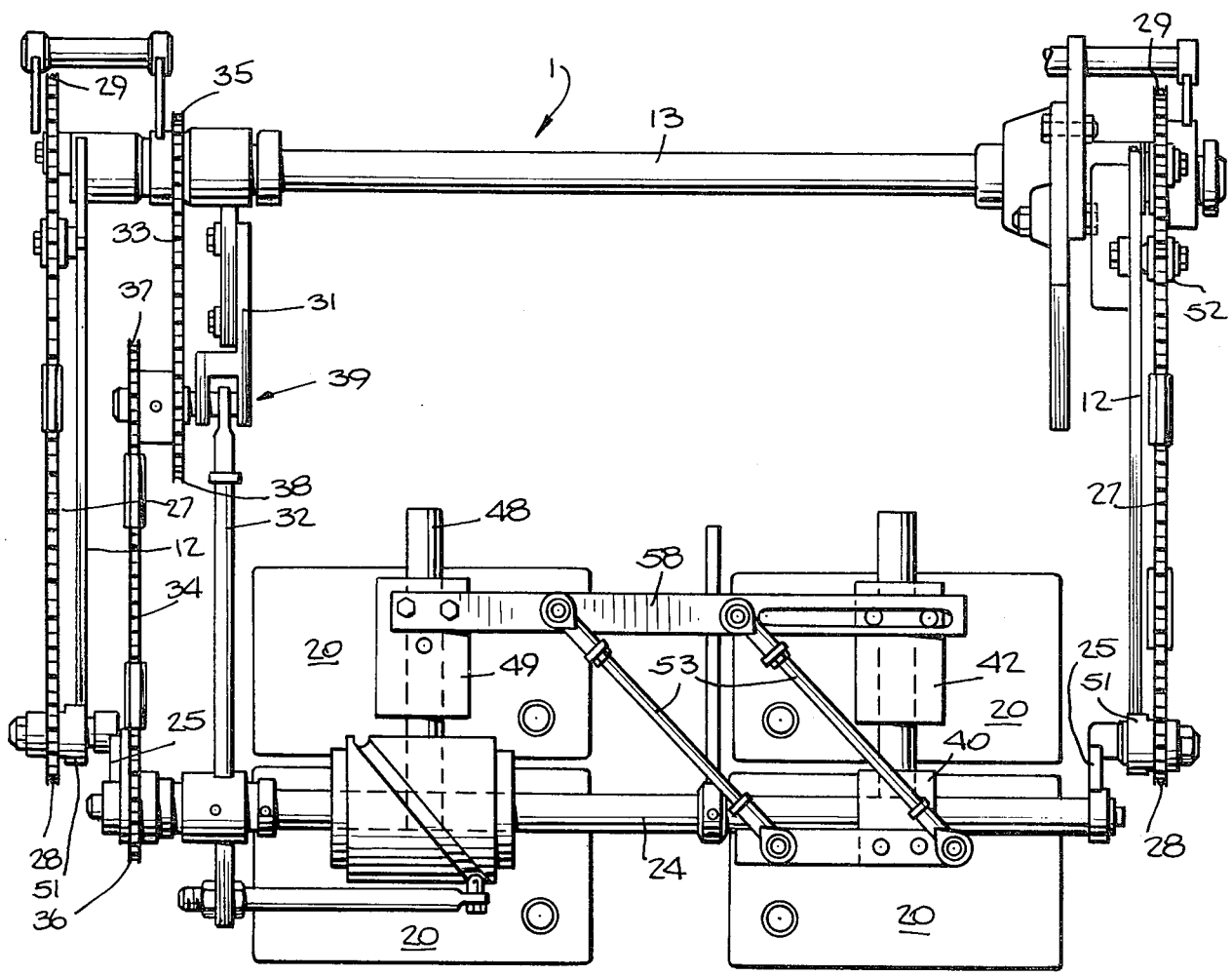
FIG. 2 is a top plan view of a preferred embodiment of the control means of the invention.
Figure 3:
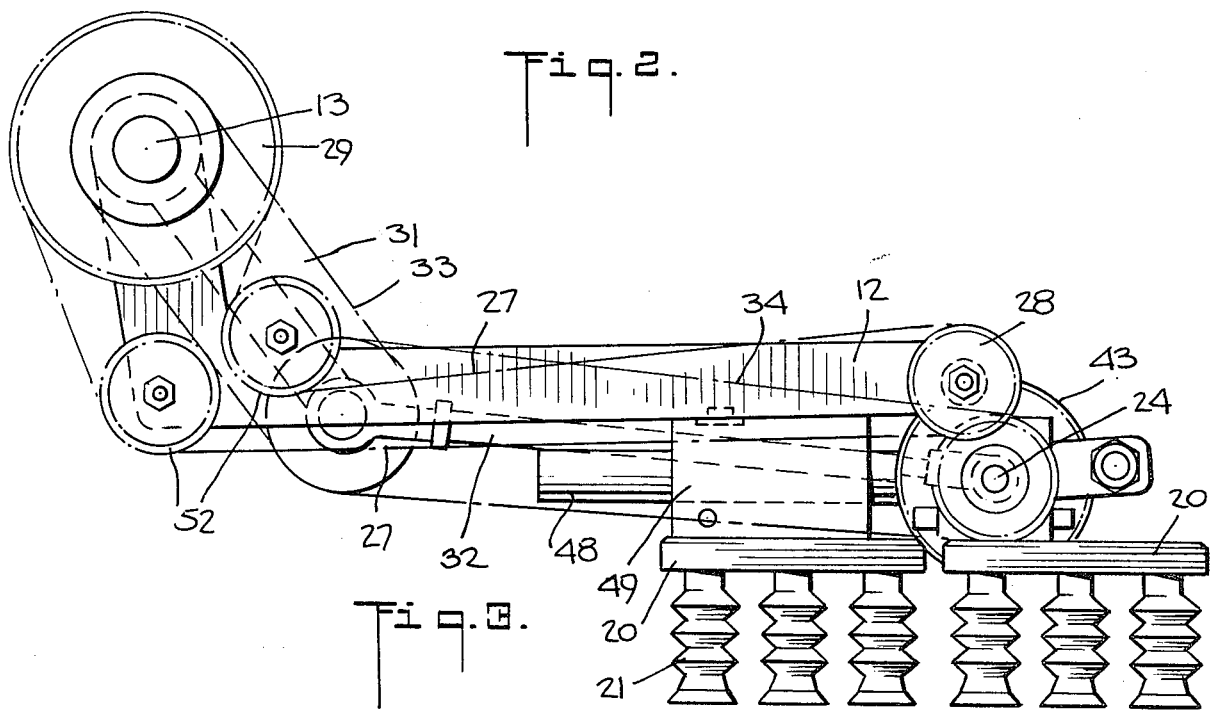
FIG. 3 is a side elevational view illustrating the control means in an egg pick-up position.

For convenience in adjusting the egg spacing between the pick-up array and the placing array, a number of individual lifter plates 20 may be employed, such as the four lifter plates 20 illustrated herein (FIG. 2). The path control means of the present invention, however, may be used with one or more plates or lifting means. In the four lifter plate embodiment illustrated, the two forward plates 20 are mounted on a suspension shaft 24 on suspension blocks such as block 40 and the additional or rear plates 20 are movable attached to the front plates 20 by a spacing adjustment system. As seen in FIG. 2, this may include rearwardly directed slide shafts 41, 48 for the rear bearing blocks 42, 49 mounting the rear plates 20 and pivoted links 53 coupling a connecting arm 58 on the rear plates 20 to the mounting block 40 for a front plate 20. In the spacing system shown in FIG. 2, a circular cam 43 is turned by shaft 24 during the transfer operation to change the position of the left hand front plate 20. Rotation of the cam 43 moves the left hand plate 20 axially of the suspension shaft 24 thereby simultaneously moving the left hand rear plate 20 axially of the shaft and causing the pivoted links 53 to move the two rear plates 20 towards or away from the front plates 20.

The lifter plates 20 are carried simultaneously through the transfer path as the suspension shaft 24 moves on the ends of the lifter arms 12. The control means of the present invention alters the path of motion of the suspension shaft 24 and thus simultaneously alters the path of movement of the lifter plates 20 and each of the group of vacuum cups 21 on the plates 20. As the lifter arms 12 swing from the left hand pick-up position to the right hand placement position (FIG. 1) the lifter plates 20 are carried through a generally arcuate path 50 as modified to a path 30 by the control means in a manner which will now be described.

During this movement, it is desirable that the lifter plates 20 maintain their original horizontal alignment, i.e. their alignment which is parallel to the trays 10 at the pick-up point and to the surface of the conveyor 2 at the placement position.

A pantograph 39 (FIG. 2) is used for this purpose including a pair of pivotally attached arms 31 and 32 and a pair of pantograph chains 33 and 34 connected together by interconnected sprockets 37 and 38. The opposite end of chain 38 engages a sprocket 35 on the machine base 14 and the outer end of chain 34 engages a sprocket 36 attached to the lifter plate suspension shaft 24. The pantograph 39 operates to continuously maintain the lifter plates 20 at a constant horizontal attitude during the movement of the lifter plates 20 to and from the conveyor 2.

The lifter plate suspension shaft 24 is mounted on the outer ends of the lifter arms 12 on a pair of orbit arms 25. Each of the two orbit arms 25 is mounted in a suitable bearing 51 on a lifter arm 12 and the suspension shaft 24 is rotatably attached to the opposite ends of the two orbit arms 25. The desired modification of the transfer path 50 of the lifter plates 20 is accomplished by the simultaneous turning of the two orbit arms 25 about their bearings 51 as the lifter arms 12 swing through the egg transfer cycle from the pick-up position to the placement position. The orbit arms 25 are controlled by means of a chain and sprocket system including chain 27 which operatively connect fixed sprockets 29 on the machine base 14 to sprockets 28 pivotally mounted on the end of the lifter arms 12. The path of the chain 27 is conformed to the preferred L-shaped lifter arms 12 by the use of a pair of idler sprockets 52 mounted on each of the two lifter arms 12.

Since the two orbit arm drive sprockets 29 are fixedly mounted on the frame 14, and are concentric with the drive shaft 13, swinging movement of the lifter arms 12 causes the two chains 27 to move on the sprocket and to thereby turn the outer orbit sprockets 28 and their interconnected orbit arms 25. This movement of the orbit arms 25 and the attached suspension shaft 24 provides the desired suspension shaft 24 movement correction as will now be described with particular reference to FIG. 4.

Figure 4:
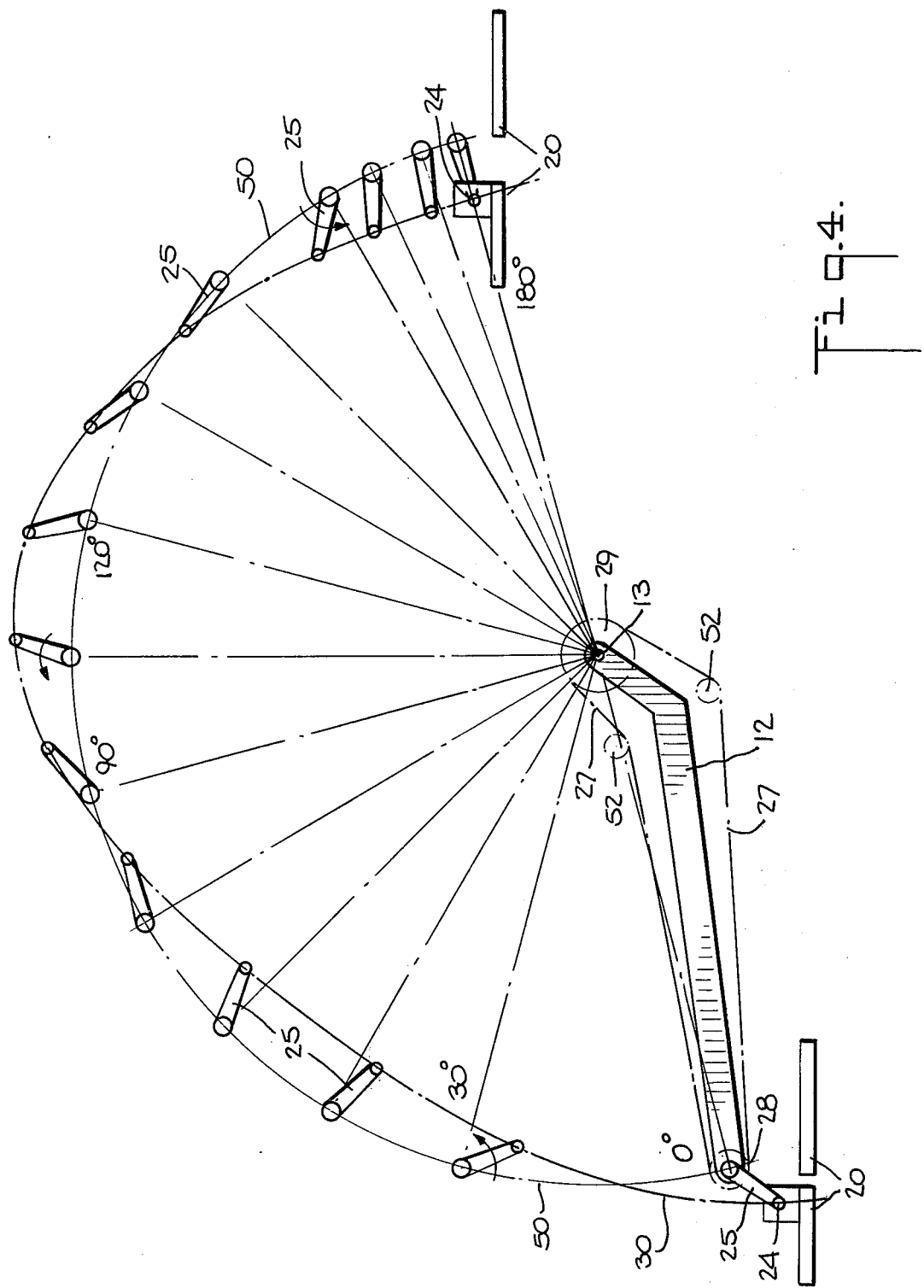
FIG. 4 is a diagrammatic view of the lifter arm and orbit arm movements.

The outer ends of the lifter arms 12 move through an arcuate path 50 in transferring the eggs 9 to the conveyor 2. A modified path 30 is followed by the suspension shaft 24 as the orbit arms 25 are swung by the operation of the chain 27 on the orbit sprockets 28 and 29. In the transfer machine 1 illustrated, and as shown in FIG. 4, the arc of movement 50 of the ends of the lifter arms 12 is approximately a half circle between the pick-up and the placement positions. During this movement it is desirable to have an almost complete revolution at the two orbit arms 25 to provide their corrective action. This result is obtained by having approximately one third as many teeth on the orbit sprockets 28 as on the stationary orbit drive sprockets 29. This preferred movement of the orbiting arms 25 is illustrated in FIG. 4. During the initial 30° or so of movement of the lifter arms 12, the orbiting arms 25, as seen in FIG. 4, rotate in a counterclockwise direction through about 60°. This motion of the orbit arms 25 provides a right hand component of motion of the orbit arms 25 and the interconnected lifter plates 20 which offsets a simultaneous left hand component of motion of the lifter arm 12 ends. The result is a substantially vertical path of movement for the lifter plates 20 and the interconnected egg vacuum cups 21 for the first few inches of lifter plate 20 movement. This provides for a smoother and more positive lifting of the eggs 9 from the trays 10 and additionally permits the lifting position to rise to compensate for a stack of trays 10 at the lift point of increasing height.

Since the photograph system 39 is holding the lifter plates 20 horizontal, the motion of the two orbit arms 25 and the attached suspension shaft 24 has no adverse effect upon the transfer through the intermediate portion of the transfer path.

As the lifter arms 12 approach the conveyor 2, however, the two orbit arms 25, as shown in FIG. 4, continue to swing in a counterclockwise direction back towards their original position. During about the last half of the transfer path 30, the orbit arms 25 provide a component of motion of the left from their counterclockwise turning which compensates in part for the right hand component of motion present in the arcuate path 50. The result of these offsetting motions provides a more vertical terminal portion of the path of the suspension shaft 24 as it approaches the conveyor to facilitate a vertical movement of the eggs 9 onto the conveyor 2 and to effect a smooth and gentle egg release.

The method illustrated diagrammatically in FIG. 4 may be used for differing arcuate paths of the lifter arms 12. If the transfer arc is shortened, for example, to a lesser arc, the number of teeth on the orbit arm sprocket 28 will be reduced by one or more teeth to provide the desired turning motion of the orbit arms 25 during the lesser movement of the lifter arms 12.

It will be seen that an improved control means is provided for a transfer machine such as is used for transferring eggs of other articles from one point to another and from one level to another and which is particularly adapted for improving the operation of a transfer machine utilizing lifter means driven by pivotally mounted lifter arms. The improved control means is relatively simple and positive in action and provides a safe and easily sanitized control system adapted for use in food handling systems, such as egg transfer machines.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an article transfer device having a pivotally mounted lifter arm means carrying an article lifter member along a curved path from a pick-up position to a placing position an improved means for adjusting the curved path comprising:
   an orbit arm having one end pivotally connected to the lifter arm means and the other end connected to the lifter member; and
   means operatively engaging said orbit arm for turning said orbit arm responsive to movement of the lifter arm means.

2. The article transfer device as claimed in claim 1 in which said means for turning said orbit arm comprises a first circular member fixed to said orbit arm, a second circular member fixedly mounted on said device, and an elongated endless coupling member interconnecting said rotatable and circular members.

3. The article transfer device as claimed in claim 1 in which said means for turning said orbit arm comprises a first sprocket attached to said orbit arm, a second sprocket fixedly mounted on said transfer device concentrically with the lifter arm means pivotal mounting, and an endless chain operatively interconnecting said first and second sprockets.

4. The article transfer device as claimed in claim 1 which further comprises means to maintain said lifter member at a constant attitude during its movement along the curved path.

5. The article transfer device as claimed in claim 4 in which said means for maintaining a constant attitude comprises a pantograph system.

6. The article transfer device as claimed in claim 1 in which said lifter arm means comprises a plurality of pivotally mounted lifter arms, an orbit arm pivotally connected at one end to the outer end of each of said lifter arms, and said lifter member being mounted on the other ends of said plurality of orbit arms.

7. The article transfer device as claimed in claim 1 in which said lifter member comprises an egg lifter including a plurality of vacuum operated egg engaging members.

8. In an egg transfer device having a plurality of pivotally mounted lifter arm members carrying an egg lifter member along a curved path from a pick-up position to a placing position an improved means for adjusting the curved path comprising:
   orbit arms having one end pivotally connected to the lifter arm members and the other end connected to the lifter member;
   a first sprocket positioned on the pivotally attached end of at least one of the orbit arms on one of said lifter arm members;
   a second sprocket fixedly mounted on the transfer device concentrically with the said one lifter arm pivotal mounting; and
   a chain operatively coupling said first and second sprockets.

9. The article transfer device as claimed in claim 8 which further comprises means to maintain said lifter member at a constant attitude during its movement along the curved path.

10. The article transfer device as claimed in claim 9 in which said means for maintaining a constant attitude comprises a pantograph system.

11. The article transfer device as claimed in claim 1 which further comprises said lifter arm means being adapted for moving said lifter member between pick-up and placing positions at substantially differing levels.

12. The article transfer device as claimed in claim 8 which further comprises said lifter arm means being adapted for moving said lifter member between pick-up and placing positions at substantially differing levels.

* * * * *